(12) United States Patent
Ruiz Dealbert et al.

(10) Patent No.: US 12,117,063 B2
(45) Date of Patent: Oct. 15, 2024

(54) LEAF SPRING, MANUFACTURING PROCESS AND MOULD OF THAT LEAF SPRING

(71) Applicant: MUELLES Y BALLESTAS HISPANO-ALEMANAS PROJECTS, S.L., Villarreal (ES)

(72) Inventors: Miguel Ruiz Dealbert, Villarreal (ES); Roberto Estal Vera, Villarreal (ES); Juan Salamero Laorden, Villarreal (ES)

(73) Assignee: MUELLES Y BALLESTAS HISPANO-ALEMANAS PROJECTS, S.L., Villarreal (ES)

(*) Notice: Subject to any disclaimer, the term of this patent is extended or adjusted under 35 U.S.C. 154(b) by 468 days.

(21) Appl. No.: 17/413,290

(22) PCT Filed: Dec. 13, 2019

(86) PCT No.: PCT/EP2019/085042
§ 371 (c)(1),
(2) Date: Jun. 11, 2021

(87) PCT Pub. No.: WO2020/120728
PCT Pub. Date: Jun. 18, 2020

(65) Prior Publication Data
US 2022/0056975 A1    Feb. 24, 2022

(30) Foreign Application Priority Data
Dec. 13, 2018  (EP) .................................. 18382923

(51) Int. Cl.
*F16F 1/36*      (2006.01)
*B29C 70/30*     (2006.01)
(Continued)

(52) U.S. Cl.
CPC .......... *F16F 1/3686* (2013.01); *B29C 70/302* (2021.05); *B29C 70/48* (2013.01);
(Continued)

(58) Field of Classification Search
CPC ............. F16F 1/3686; F16F 2224/0241; F16F 2226/04; F16F 2230/0005; F16F 2238/022; B29C 70/302; B29C 70/48
See application file for complete search history.

(56) References Cited

U.S. PATENT DOCUMENTS 3,056,706 A * 10/1962 Knoppel ................. B29C 70/20
156/169
3,111,569 A * 11/1963 Rubenstein ............. B29C 70/86
264/45.2

(Continued)

FOREIGN PATENT DOCUMENTS

EP         3343059 A1    7/2018

OTHER PUBLICATIONS

International Search Report issued in International Application No. PCT/EP2019/085042 issued on Feb. 27, 2020.

*Primary Examiner* — Bradley T King
*Assistant Examiner* — James K Hsiao
(74) *Attorney, Agent, or Firm* — Quinn IP Law

(57) ABSTRACT

Leaf spring comprising at least one leaf of composite material that comprises:
a central body (1), and
two eyes (2),
wherein the central body (1) comprises its longitudinal end zones (1.1) embedded in a cavity (2.1) of the eyes (2), wherein the sections transversal to the longitudinal direction of the central body (1) of the longitudinal end zones (1.1) of the central body (1) and the cavities (2.1) of the eyes (2) present increasing dimensions towards (Continued)

the longitudinal end of the leaf spring and that comprises fibre fabrics (7, 8, 9) of the central body (1) stacked in a Z-direction perpendicular to the longitudinal direction of the central body (1) and to the longitudinal direction of the hole (3) of the eyes (2) and comprises fibre fabrics (10, 11) of the eyes (2) stacked in a parallel direction to the longitudinal direction of the longitudinal axis of the hole (3).

13 Claims, 4 Drawing Sheets

(51) Int. Cl.
 *B29C 70/48* (2006.01)
 *F16F 1/368* (2006.01)
 *B29L 31/00* (2006.01)

(52) U.S. Cl.
 CPC . *B29L 2031/774* (2013.01); *F16F 2224/0241* (2013.01); *F16F 2226/04* (2013.01); *F16F 2230/0005* (2013.01); *F16F 2238/022* (2013.01)

(56) References Cited

U.S. PATENT DOCUMENTS

| | | | | |
|---|---|---|---|---|
| 3,219,333 A * | 11/1965 | Derschmidt | ........ | B29D 99/0003 244/133 |
| 3,900,357 A * | 8/1975 | Huchette | ........... | B29C 70/345 156/185 |
| 3,968,958 A * | 7/1976 | Huchette | ........... | B29C 70/345 267/47 |
| 4,038,885 A * | 8/1977 | Jonda | ........... | F16F 1/3686 416/134 A |
| 4,114,962 A * | 9/1978 | Konig | ........... | B29D 99/0025 428/107 |
| 4,468,014 A * | 8/1984 | Strong | ........... | F16F 1/22 267/47 |
| 4,475,723 A * | 10/1984 | Meyer | ........... | F16F 1/3686 267/47 |
| 4,556,204 A * | 12/1985 | Pflederer | ........... | F16F 1/3686 267/148 |
| 4,565,356 A * | 1/1986 | Nickel | ........... | F16F 1/3686 264/137 |
| 4,659,071 A * | 4/1987 | Woltron | ........... | B60G 11/12 156/169 |
| 4,688,778 A * | 8/1987 | Woltron | ........... | B29C 43/32 267/148 |
| 4,749,534 A * | 6/1988 | Robertson | ........... | F16F 1/368 264/157 |
| 4,771,997 A * | 9/1988 | Haldenwanger | ....... | F16F 1/3686 267/260 |
| 4,786,033 A * | 11/1988 | Kofler | ........... | B29D 99/0007 156/185 |
| 4,801,129 A * | 1/1989 | Wells | ........... | F16F 1/3683 267/52 |
| 4,886,254 A * | 12/1989 | Carpentier | ........... | F16F 1/3686 267/260 |
| 4,894,108 A * | 1/1990 | Richard | ........... | B29C 70/24 264/258 |
| 4,969,633 A * | 11/1990 | Ryan | ........... | B29C 33/005 280/124.17 |
| 4,969,634 A * | 11/1990 | Bellingham | ........... | F16F 1/3686 267/260 |
| 6,361,032 B1 * | 3/2002 | Lawson | ........... | F16F 1/368 267/37.1 |
| 7,032,624 B2 * | 4/2006 | Bruske | ........... | D03C 9/0691 139/30 |
| 9,115,778 B2 * | 8/2015 | Wagner | ........... | F16F 7/123 |
| 10,767,720 B2 * | 9/2020 | Wolf-Monheim | ....... | B32B 15/06 |
| 2008/0007022 A1 * | 1/2008 | Jones | ........... | B60G 3/10 280/124.13 |
| 2012/0211931 A1* | 8/2012 | Fane De Salis | ........ | F16F 1/368 267/158 |
| 2014/0042680 A1 | 2/2014 | Glover | | |
| 2014/0167339 A1* | 6/2014 | Wagner | ........... | F16F 1/3686 267/260 |
| 2015/0343875 A1* | 12/2015 | Spiegel | ........... | F16F 1/368 280/5.515 |
| 2016/0207369 A1* | 7/2016 | Krahn | ........... | B60G 7/008 |
| 2018/0178608 A1* | 6/2018 | Zawacki | ........... | F16F 1/3686 |
| 2019/0178324 A1* | 6/2019 | Krieg | ........... | F16F 1/368 |
| 2019/0331187 A1* | 10/2019 | Ruiz Dealbert | ....... | F16F 1/3686 |

* cited by examiner

LEAF SPRING, MANUFACTURING PROCESS AND MOULD OF THAT LEAF SPRING

CROSS REFERENCE TO RELATED APPLICATIONS

This application claims the benefit of PCT Patent Application No. PCT/EP2019/085042 filed on Dec. 13, 2019, entitled "LEAF SPRING, MANUFACTURING PROCESS AND MOULD OF THAT LEAF SPRING," which is incorporated by reference in its entirety in this disclosure.

FIELD OF THE INVENTION

The invention is based on the development of a leaf spring that possesses at least one leaf with a central body made of a composite material with a polymeric matrix, preferably thermostable, for example, epoxy, and eyes made also of a composite material with a polymeric matrix in a later process, by means of compression moulding. The leaf spring object of the invention can be applied to both light and heavy vehicles.

BACKGROUND

The leaf spring is a suspension element that can consist in one or more leaves. The leaf springs have a central body and two eyes located at the opposing longitudinal ends of said central body destined to be connected to the vehicle on which the leaf spring is installed.

A single-leaf spring is one that is formed by a single leaf, or that is solid, regardless of the type of material which it is made of.

There exist leaf springs of one and several leaves made of composite material as well as leaf springs that comprise a hybrid central body made of a composite material while the eyes are made of a metallic material.

A sheet of composite material is understood to be a sheet constituted by a set of fibre fabrics, for example, of glass or carbon, embedded in a polymeric matrix.

In the case of the leaf springs of one and several leaves, both their dimensions, as well as their shape, are determined, on the one hand, by the mounting requirements of the vehicle on which they are installed on, as well as by the displacement or deformation of the leaf spring in the Z axis of the vehicle and, on the other hand, by the desired stiffness due to the forces that the leaf spring must withstand during use.

The levels of force that must be supported by a single-leaf spring are generally greater than those supported by leaf springs of two or more leaves for the same conditions of load and stiffness. This is because all of the tensions that must be supported by the suspension are supported by a single leaf.

Taking into account the above, one of the disadvantages of the leaf springs manufactured entirely of composite material is produced in the zone of the eyes. The tensions to be supported by this zone, along with problems in the configuration and manufacturing of said eyes, generate a multitude of problems that do not exist in leaf springs configured from various metal leaves wherein the eyes are made of the same material. Due to the characteristics of the forces that occur in the eye zone during the braking of the truck and during the incorporation of the silence blocks in the leaf spring eye, tensions are produced in the direction of lamination of the eyes and in the direction of the stacking of the composite material sheet that cause the beginning of delaminations of the material in the zone of the eye and the total failure of the leaf spring due to these delaminations.

In addition to the above problem in the eyes of the leaf spring, this type of leaf springs presents another disadvantage resulting from the mechanical properties of the composite material. It is known that the mechanical properties of the compound material are inferior to those of the steel, which causes the need to increase the thickness of the leaf spring along its entire length, with the maximum thickness in the central zone. As a result of this increased thickness, the leaf spring of composite material is able to withstand the same forces as a metallic leaf spring. The problem caused by this increase in thickness is that it makes the assembly of the leaf spring in the truck more difficult since this maximum thickness is limited by a particular value resulting from the shape of the space in which the leaf spring is contained.

Another disadvantage of the leaf springs manufactured totally of composite material is the price of such material, since the price of the fibre and resin is higher than the price of steel.

In state of the art different designs of leaf spring to resolve the problems mentioned are known. For example, there are different leaf springs and manufacturing processes of the leaf spring eyes, however, none of them resolves satisfactorily either the problem of resistance to forces of the leaf spring or, principally, the development of an automated and simple manufacturing process.

SUMMARY OF THE INVENTION

Both the leaf spring object of the invention, as well as its manufacturing process, resolve the above-mentioned problems.

The leaf spring and the manufacturing method object of the invention manage to resolve the problems of delaminations and ruptures of both the central body of the leaf spring as well as in the eyes. In this way, a dynamic behaviour is obtained that is greater than or equal to that of the leaf spring made entirely of steel, and a reduction of weight is achieved of 50% or 60% compared to the metallic solution.

The leaf spring object of the invention comprises at least one leaf of a composite material that comprises, in turn:

a central body that has two longitudinal end zones comprising at least one leaf of composite material comprising, in turn, a set of fibre fabrics embedded in a polymeric matrix, and two eyes, located in the longitudinal end zones of the central body that comprise a hole to connect the leaf spring to a vehicle, wherein the hole comprises a longitudinal axis perpendicular to the longitudinal direction of the central body and wherein the eyes comprise a set of fibre fabrics made of composite material embedded in a polymeric matrix, the central body comprises its longitudinal end areas embedded in an cavity of the eyes, wherein the sections transversal to the longitudinal direction of the central body of the longitudinal end zones of the central body and the eye cavities present increasing dimensions toward the longitudinal end of the leaf spring and wherein comprises fibre fabrics of the central body stacked according to a Z-direction perpendicular to the longitudinal direction of the central body and to the longitudinal direction of the hole of the eyes and comprises fibre fabrics of the eyes stacked according to a direction parallel to the direction of the longitudinal axis of the hole.

In the present invention, the longitudinal direction of the leaf spring, which extends from eye to eye of the leaf spring, is to be called the X-direction. The transverse direction Y will be the direction of the longitudinal axis of the holes for the eyes, which is perpendicular to the longitudinal direction of the leaf spring, and the Z direction will be perpendicular to the previous two and coincides with the Z-direction of the vehicle on which the leaf spring is installed.

The leaf spring object of the invention, therefore, can possess multiple leaves or be single-leaf, but, at a minimum, it will comprise one leaf, specifically the principle leaf, which in turn comprises a central body manufactured with at least one leaf of composite material formed by a set of fibre fabrics embedded in a polymeric matrix, preferably thermostable. For their part, the eyes of the leaf spring are manufactured in a later process by moulding, preferably by compression, of compound material on the central body of the leaf spring giving shape to the eyes. Both bodies are united without the need for any type of adhesive or mechanical connection between them, since they are united during the manufacturing process of the eyes due to the strength of adhesion of the material of the eyes, as well as the specific geometry of the ends of the central body and the eyes of the leaf spring.

To achieve a leaf spring with greater resistance, the fibre fabrics will orient the fibres unidirectionally so that the fibres of the central body will have the longitudinal orientation of the central body and the fibres of the eyes will also have said longitudinal orientation to the central body.

The fibre fabrics of the eyes will be, preferably, pre-impregnated with a polymeric resin, so that they will be previously embedded in the said polymeric matrix.

The manufacturing process of the single-leaf spring object of the invention comprises the following steps:
cutting a set of fibre fabrics configured to form at least the sheet of a composite material of the central body,
stacking of at least the set of fibre fabrics in a forming tool placed in the longitudinal direction to the central body and stacked in a direction perpendicular to the central body and so that the central body comprises the longitudinal end areas with a section transversal to the longitudinal direction of the central body increasing toward the longitudinal end of the central body,
preforming the set of fibre fabrics for the generation of a preform of the central body,
positioning the central body preform in an injection mould to proceed to the injection of polymeric matrix,
injecting polymeric resin into the injection mould,
curing the central body,
cutting the fibre fabrics of the eyes wherein part of the fibre fabrics comprise a cavity for embedding the longitudinal end zones of the central body and so that the cavity comprises a transversal section to the longitudinal direction of the central body increasing toward the longitudinal end of the central body,
positioning at least the fibre fabrics of the eyes in a mould for forming the eyes,
positioning the longitudinal end zones of the central body in the forming mould of the eyes so that the longitudinal end zones of the central body are embedded in the cavity of the fibre fabrics and so that the orientation of the fibres of the fibre fabrics of the eyes is in the longitudinal direction of the central body and stacked in a direction parallel to the axis of the hole,
moulding the leaf spring eyes on the longitudinal end zones of the central body.

The central body of the leaf spring object of the invention can be manufactured preferably using any of the processes of Resin Transfer Moulding (RTM), for example:
Low-pressure RTM (LP-RTM)
High-pressure RTM (HP-RTM)
High-pressure compression (HP-CRTM)

For their part, the leaf spring eyes are manufactured around the ends of the cured central body of the leaf spring by moulding, preferably by compression, and preferably of pre-impregnated materials, giving shape to the eyes of the leaf spring according to the necessary geometrical and mechanical requirements. Preferably, the material of the eyes may be:
Moulded composite sheet (MCS) of cut glass or carbon fibre and polymeric matrix.
Moulded composite sheet (MCS) of glass or carbon tissue and polymeric matrix.
Moulded composite sheet (MCS) with long oriented fibre of glass or carbon and polymeric matrix.
Bulk moulding composite (BMC) of carbon fibre and polymeric matrix.

BMC and MCS are pre-impregnated materials whose advantage is that they are manufactured by applying pressure and temperature to a mould and that they flow in such a way that fill the entire mould. The advantage is that the process of laminating and forming is simpler than with other pre-impregnated materials and without the need for an autoclave.

One of the most important aspects of the leaf spring object of the invention is the joint between the central body and the eyes. For this, it is necessary to take into account the following aspects:
The geometry of the ends of the central body of the leaf of the leaf spring and the cavity of the eye.
To ensure that the eyes of the leaf spring do not separate from the central body due to mechanical stresses produced during use of the leaf spring, the ends of the central body are designed with a transversal section increasing toward the longitudinal end with the purpose of increasing its ability to transmit forces beyond the adhesion capacity of the materials.
The sequence of stacking and the orientation of the different layers that form the central body of the leaf spring.
The fabrics are oriented mostly in the longitudinal direction of the leaf spring, although there could also be localised fabrics in other directions.
The selection of materials, orientation, and order of the fabrics that form the eyes.

Because the forces must be transmitted by the eye from its junction with the central body of the leaf spring to its attachment to the vehicle chassis, the orientation and direction of stacking of the different fabrics are important. This stacking seeks to maximize the resistance of the eye by orienting the fabrics in the direction of the load transmission, that is to say, in the longitudinal direction of the leaf spring and with a stacking direction perpendicular to that of the central body of the leaf spring to avoid the "opening" of the eye. Preferably, the fabrics will be unidirectional, with a fibre orientation in the longitudinal direction of the leaf spring.

A mould is also the object of this invention that permits the manufacturing process of the leaf spring eyes directly onto the central body of the completed leaf spring. The mould that is the object of the invention comprises:
means for positioning the fibre fabrics of the eyes wherein part of the fibre fabrics comprise a cavity for embedding the longitudinal end zones of the central body and so that the cavity comprises a section transverse to the longitudinal direction of the central body increasing toward the longitudinal end of the central body, means for positioning and clamping the longitudinal end zone of a cured central body, so that the end zones of the longitudinal central body are embedded in the cavity of the fibre fabrics and so that the orientation of the fibres of the fibre fabrics of the eyes are positioned in the longitudinal direction to the central body and stacked in a direction parallel to the axis of the hole, and a pin for moulding the hole in the eye.

Thus, the indicated mould is designed in a way that allows:

To introduce in it the ends of the central body of the leaf spring leaving a cavity for the rest of the eye and also to allow the rest of the central body of the leaf spring to remain outside the mould.

To allow the various fibre fabrics, preferably pre-impregnated, in the mould on the longitudinal end zones of the central body of the leaf spring.

To close the mould on the central body of the leaf spring to obtain the eye.

To subsequently remove the assembly.

DESCRIPTION OF THE FIGURES

To complete the description and to provide a better understanding of the invention, the following figures are provided. These figures are an integral part of the description and illustrate an embodiment of the invention.

DETAILED DESCRIPTION OF THE INVENTION

Figure 1:
FIG. 1 is a side view of an embodiment of a single-leaf spring according to the invention that comprises a central body and two eyes for their connection to a car.

In FIG. 1, a single-leaf spring is represented according to an embodiment of the invention that comprises a central body (1) and two eyes (2) located at the longitudinal ends of the central body (1). The eyes (2) comprise, in turn, a hole (3) for their connection to the vehicle on which the leaf spring is located.

Figure 2:
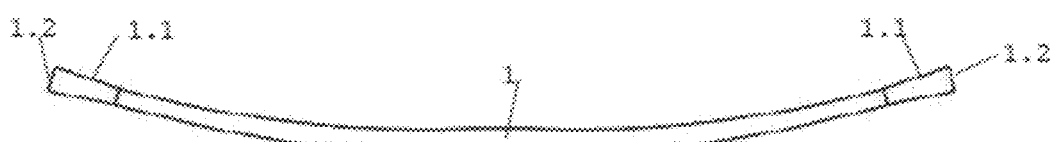
FIG. 2 shows a side view of the central body of the leaf of the leaf spring corresponding to the embodiment of FIG. 1.

FIG. 2 shows a side view of the central body (1) of the leaf spring including the two longitudinal end zones (1.1) whose geometry is designed to increase its capacity to transmit the loads between the central body (1) and the eyes (2) without failure of the leaf spring. In this manner, separation of the eye (2) from the central body (1) is prevented.

Figure 3:
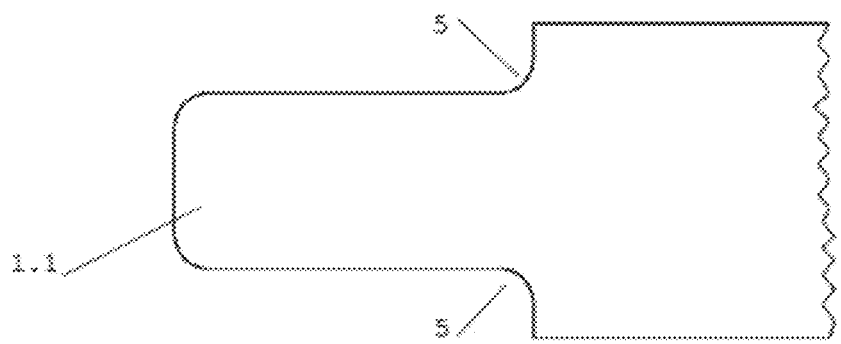
FIG. 3 shows a plan view of an embodiment of a longitudinal end zone of the central body of the leaf spring.
Figure 4:
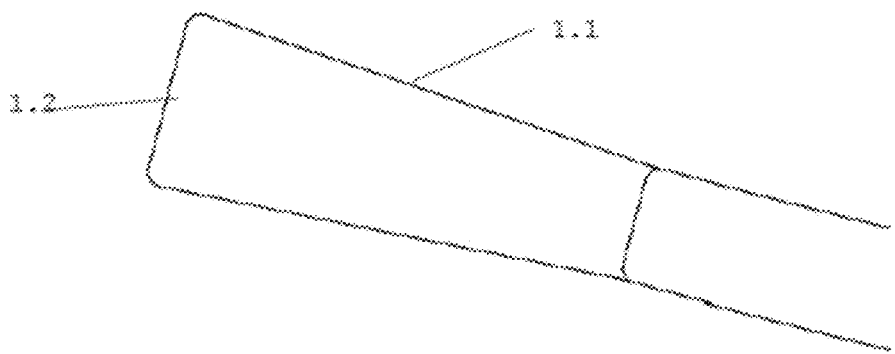
FIG. 4 shows a side view of an embodiment of a longitudinal end zone of the central body of the leaf spring.

FIGS. 3 and 4 show plan and side views of one of the two longitudinal end zones (1.1) of the central body (1) in which one can see how its geometry is adapted by means of a wedge termination, that is to say, by means of a section transversal to the longitudinal direction of the central body (1) increasing toward the longitudinal end (1.2) that helps to keep the central body (1) and the eyes joined (2) during use of the leaf spring. Specifically, in the embodiment, the widening section of the longitudinal end zones (1.1) is located in the plane that contains the longitudinal direction of the central body (1) and the Z-direction of stacking.

In addition, the longitudinal end zone (1.1) of the central body (1) comprises a recess (5) in the direction of the axis of the hole (3) in the plant view, so that the longitudinal end area (1.1) can be accommodated in the cavity (2.1) of the leaf spring eye (2) so that the width of the eye (2) does not exceed that of the central body (1) of the leaf spring.

Figure 5:
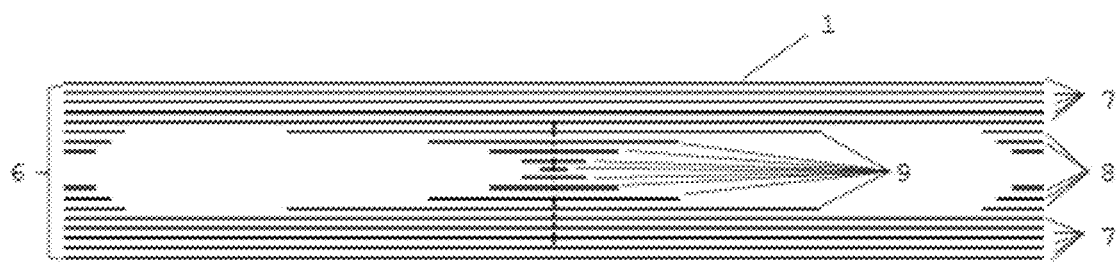
FIG. 5 shows a side view of an embodiment of the central body sheet of the leaf spring, with the fibre fabrics placed in the longitudinal direction of the leaf spring.

FIG. 5 shows a side view in section of the central body (1) of the leaf spring in which an embodiment of the stacking of sheet (6) can be seen including fabrics of entire fibres (7) with an adapted geometry in longitudinal end zones (1.1), some fabrics of central reinforcement (9) required to achieve the necessary widened profile in the central body (1) of the leaf spring, and some end reinforcement fabrics (8) that form the wedge shape of the longitudinal ends (1.1) of the central body (1).

Figure 6:
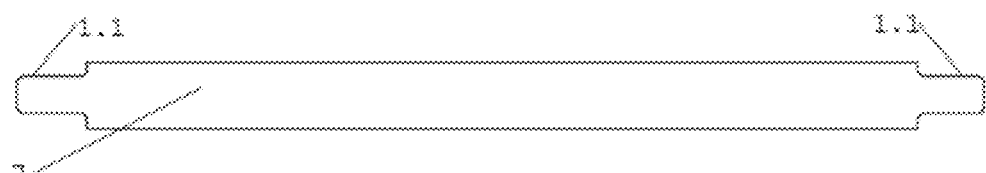
FIG. 6 shows a plan view of an embodiment of the geometry of a section of the sheet fabrics that cover the total length of the leaf spring body, also noting the end zone of said sheets.

FIG. 6 shows the cross-section geometry that the sheet fabrics (7) would have from the first set of fabrics (7) that comprise the total length of the central body (1) of the leaf spring, also noting the recess (5) of the end zone (1.1). The geometry of the recess (5) or narrowing in the end zone (1.1) in FIG. 6 could also be obtained by machining the longitudinal end zone (1.1) of the central body (1) of the leaf spring, since all the fabrics (7, 9) are according to the cut pattern of FIG. 7.

Figure 7:
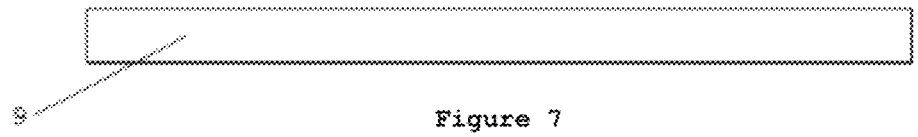
FIG. 7 shows a plan view of the geometry of a cross-section of an embodiment of the central reinforcement fabrics of the central body of the leaf spring.

FIG. 7 shows a plan view of an embodiment of the third set of fabrics of central reinforcement (9).

Figure 8:
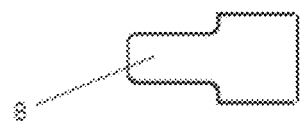
FIG. 8 shows a plan view of the geometry of a cross-section of an embodiment of the reinforcement fabrics of the ends of the central body.

FIG. 8 shows an embodiment of the second set of fabrics of the ends (8) reinforcement. The positioning of the central reinforcement (9) fabrics and the reinforcement fabrics of the ends (8) can be carried out in any order among themselves.

Figure 9:
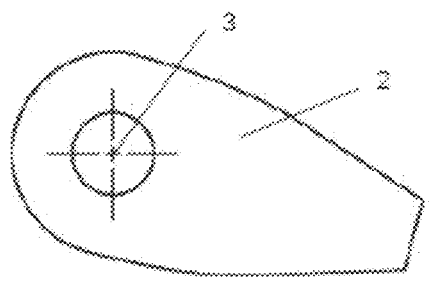
FIG. 9 shows a side view of a leaf spring eye.

FIG. 9 shows a side view of the eye (2) in which can be seen the hole (3) necessary to accommodate the leaf spring silentblocks through which it would be attached to the vehicle.

Figure 10:
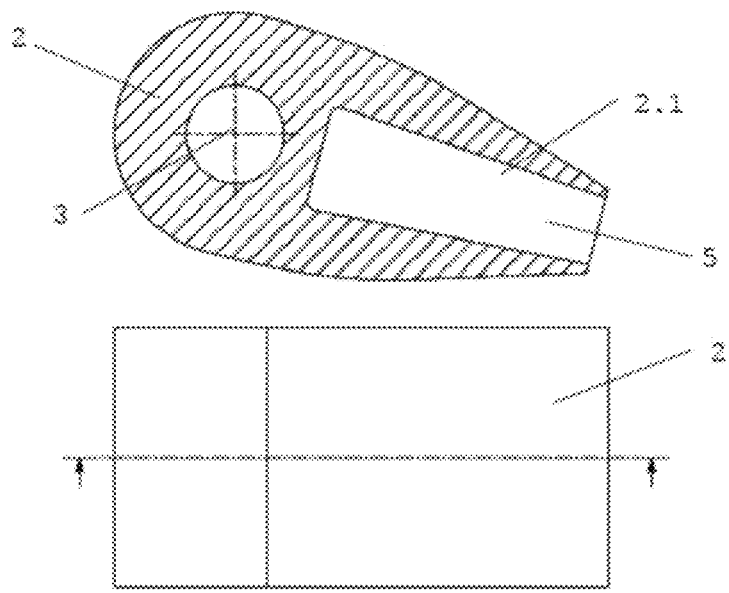
FIG. 10 shows a plan view and a side view of a longitudinal section of the inner part of an embodiment of the leaf spring eye wherein the cavity in which will fit the longitudinal end zone of the central body of the leaf spring can be seen.

FIG. 10 shows a plan view of the leaf spring eye (2) and a cross-section for a longitudinal plane that shows the hole (3) to accommodate the silentblock bushings and cavity (2.1) to accommodate the longitudinal end zone (1.1) of the central body (1) of the leaf spring, presenting said cavity (2.1) increasing dimensions toward the longitudinal end of the leaf spring.

Figure 11:
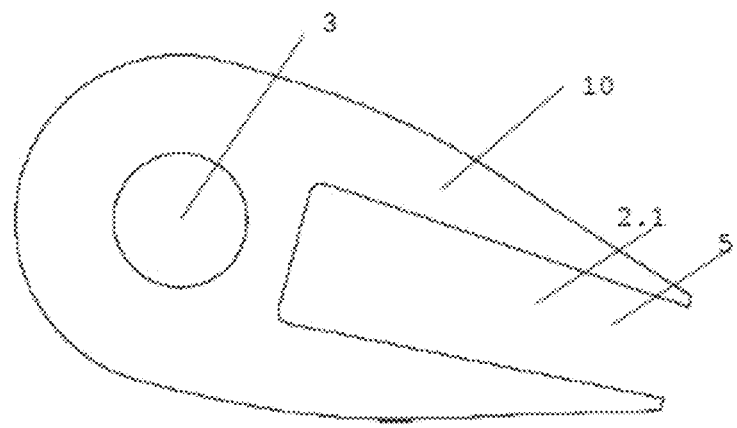
FIG. 11 shows the cross-section geometry of an embodiment of some fabrics of the leaf spring eyes that possess a cavity to accommodate the ends of the central body of the leaf spring.

FIG. 11 shows a first set of the fabrics (10) that form the eye (2) with the hole (3) to accommodate the silentblock bushings and cavity (2.1) to accommodate the longitudinal end zone (1.1) of the central body (1) of the leaf spring. This first set of fabrics (10) are therefore those that comprise the cut of the cavity (2.1) to accommodate the longitudinal ends (1.1) of the central body (1) of the leaf spring.

Figure 12:
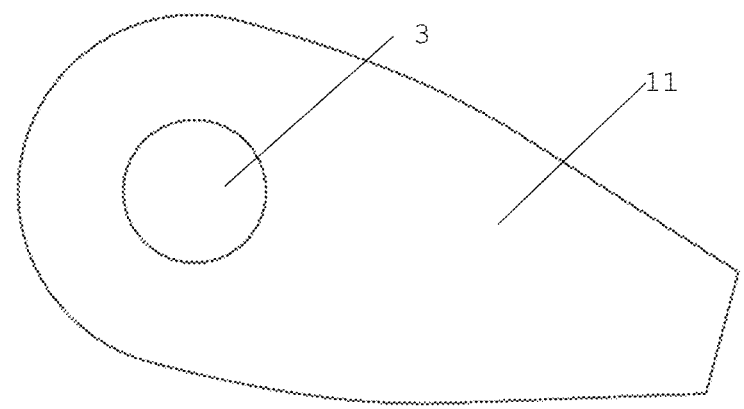
FIG. 12 shows the cross-section geometry of an embodiment of the most external fabrics of the leaf spring eyes that do not possess the indicated cavity to accommodate the ends of the central body of the leaf spring.

FIG. 12 shows one of the external fabrics (11) that form the eye (2) of the leaf spring with the hole (3) to accommodate the silentblock bushings. The external fabrics (11) are those that remain on the outside of the eye (2), for which reason they do not possess the cavity (2.1) to accommodate the longitudinal end (1.1) of the central body (1).

Figure 13:
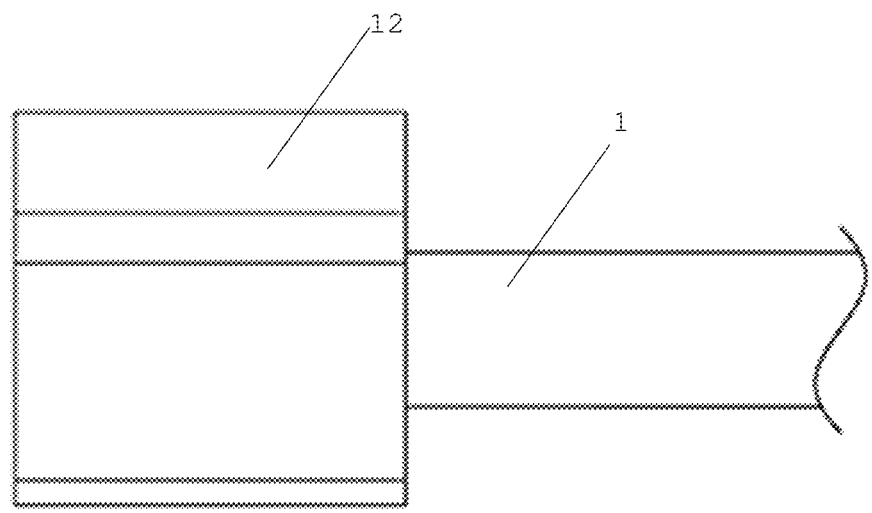
FIG. 13 shows a plan view of an embodiment of the manufacturing mould of the leaf spring eye along with one of the longitudinal end zones of the central body of the leaf spring introduced into the said mould.

FIG. 13 shows a plan view of the process of manufacturing the leaf spring eye (2) directly on the central body (1) of the leaf spring using a mould (12) specifically designed for this purpose.

Figure 14:
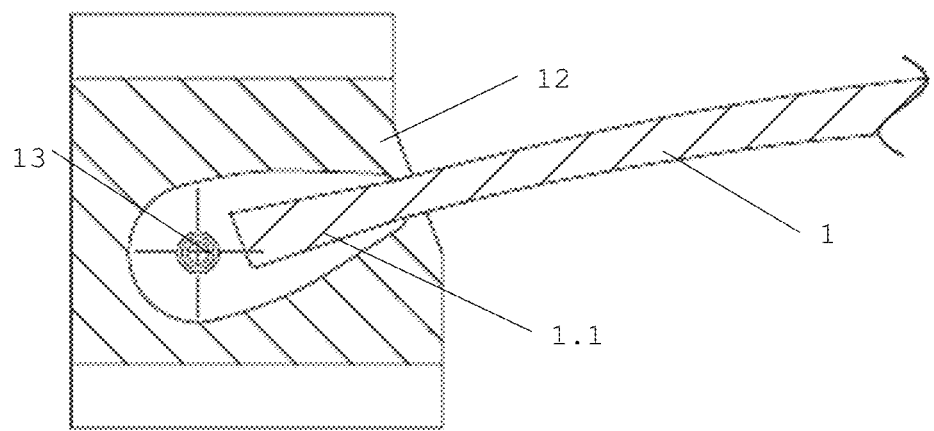
FIG. 14 shows a side view in section of the embodiment of FIG. 13 of the eye mould along with one of the longitudinal end zones of the central body of the leaf spring introduced into the said mould.

FIG. 14 shows a side view in cross-section of the manufacturing of the leaf spring eye (2) wherein the central body (1) of the leaf spring can be seen, whose (4) longitudinal end zone (1.1) is introduced into the manufacturing mould (12) of the eye (2) and wherein the pin (13) that gives shape to the central hole (3) of the eye (2) can be also seen.

The manufacturing process of a single-leaf spring according to an embodiment of the invention comprises the following steps:
cutting a set of fibre fabrics (7, 8, 9) that form the central body (1),
stacking the set of fibre fabrics (7, 8, 9) in a forming tool in the longitudinal direction of the central body (1) and so that the central body (1) comprises the longitudinal end zones (1.1) with a section transversal to the longitudinal direction of the central body (1) increasing toward the longitudinal end (1.2),
preforming the set of fibre fabrics (7, 8, 9) for the generation of a central body (1) preform, for which the material must, to preform it, preferably contain a binder, and pressure and temperature must be applied during a certain period of time,
positioning the central body (1) preform in an injection mould to proceed to the injection of polymeric matrix, for example by using the RTM,
injecting polymeric resin into the injection mould,
curing the central body (1),
removing the central body (1) of the leaf spring from the RTM mould and surface preparation of the ends for their proper adhesion with the material of the eyes (2). Said surface preparation can include edge finishing of the ends, generation of the agreed radii, cleaning and sanding of the surface that will be enveloped by the eye.
cutting fabrics, preferably MCS or BMC pre-impregnated, for the eyes (2),
positioning in the forming mould (12) the first package of external fabrics (11), of one of the sides of the eyes (2) in the forming mould (2),
positioning in the forming mould (12) the central fabrics (10) of the leaf spring (10) eye (2),
positioning in the mould (12) the rest of the external lateral fabrics (11), of the other side, which will give the final shape to the leaf spring eye (2),
preparing the surface of the central body (1) of the leaf spring and particularly of its ends (1.1) to be inserted into the manufacturing mould (12) of the ends, which includes edge treatment, generation of the agreed radii, cleaning and sanding of the surface that will be enveloped by the eye.
placing longitudinal external areas (1.1) of the central body (1) in the forming mould of the eyes (2), so that longitudinal end zones (1.1) of the central body (1) are embedded in the cavity (2.1) of the eyes (2),
moulding the leaf spring eyes (2), preferably by compression moulding, on the longitudinal end zones (1.1) of the central body (1).

The invention claimed is:

1. A leaf spring having at least one leaf of composite material comprising:
a central body that has two longitudinal end zones and includes at least one sheet of a composite material comprising, in turn, a set of fibre fabrics embedded in a polymeric matrix, and
two eyes, located in the longitudinal end zones of the central body comprising a hole to connect the leaf spring to a vehicle, wherein the hole comprises a longitudinal axis perpendicular to the longitudinal direction of the central body and wherein the eyes comprise a set of fibre fabrics of composite material embedded in a polymeric matrix,
wherein the central body comprises its longitudinal end areas embedded in an eye cavity, wherein the sections transversal to the longitudinal direction of the central body of the longitudinal end zones of the central body and of the eye cavities present increasing dimensions toward the longitudinal end of the leaf spring and wherein it comprises fibre fabrics of the central body stacked according to a Z-direction perpendicular to the longitudinal direction of the central body and to the longitudinal direction of the hole of the eyes and comprises fibre fabrics of the eyes stacked according to a direction parallel to the direction of the longitudinal axis of the hole,
wherein the fibre fabrics of the eyes comprise:
a first set of fibre fabrics that comprise a cavity for embedding the longitudinal end zones of the central body and so that the cavity comprises a section transverse to the longitudinal direction of the central body increasing toward the longitudinal end of the central body, and
a second set of fibre fabrics located after the first set of fibre fabrics toward the outside of the eye.

2. The leaf spring, according to claim 1, wherein the central body comprises an increasing section in the longitudinal end zones in a plane that contains the longitudinal direction of the central body and the Z-direction of stacking.

3. The leaf spring, according to claim 1, wherein the central body comprises a recess of the dimension of the longitudinal end zones in the direction of the axis of the hole.

4. The leaf spring, according to claim 1, wherein the central body comprises:

a first set of fibre fabrics wherein each fibre fabric extends in the longitudinal direction of the central body between the longitudinal ends of the central body, and a second set of reinforcement fabrics located in the longitudinal direction of the central body and located in the longitudinal ends of the central body to form the increasing section of said ends.

5. The leaf spring, according to claim 4, wherein the central body comprises a third set of reinforcement fibre fabrics located in the longitudinal direction of the central body and located in the central part thereof to form an increasing section in the said central part.

6. The leaf spring, according to claim 1, wherein the orientation of the fibres of the fibre fabrics of the central body and the eyes is uni-directional and longitudinal to the central body of the leaf spring.

7. The leaf spring, according to claim 1, wherein the leaf spring is a single-leaf.

8. A process of manufacturing a leaf spring having at least one leaf of composite material including a central body having two longitudinal end zones and at least one sheet of composite material and two eyes located in the longitudinal end zones of the central body that comprise a hole for the connection of the leaf spring to a vehicle, wherein the hole comprises a longitudinal axis perpendicular to the longitudinal direction of the central body, the process comprising:

cutting a set of fibre fabrics configured to form at least the composite material sheet of the central body, stacking of at least the set of fibre fabrics in a forming tool so that they are located in a longitudinal direction to the central body and stacked in a direction perpendicular to the length of said central body and so that the central body comprises the longitudinal end zones with a section transversal to the longitudinal direction of the central body increasing toward the longitudinal end of the central body, preforming the set of fibre fabrics for the generation of a central body preform, positioning the central body preform in an injection mould to proceed to the injection of polymeric matrix, injecting polymeric resin into the injection mould, curing the central body, cutting fibre fabrics of the eyes wherein part of the fibre fabrics comprises a cavity for embedding the longitudinal end zones of the central body and so that the cavity comprises a section transversal to the longitudinal direction of the central body increasing toward the longitudinal end of the central body, positioning at least the fibre fabrics of the eyes in a mould for forming the eyes in accordance with the following steps:

positioning a set of fibre fabrics located adjacent to the external part of the eye in the eye mould, and positioning a set of fibre fabrics that comprise the cavity for embedding the longitudinal end zones of the central body and so that the cavity comprises a section transverse to the longitudinal direction of the central body increasing toward the longitudinal end of the central body, positioning the longitudinal end zones of the central body in the forming mould of the eyes so that the longitudinal end zones of the central body are embedded in the cavity of the fibre fabrics and so that the orientation of the fibre fabrics of the eyes are located in the longitudinal direction of the central body and stacked in a parallel direction to the axis of the hole, and moulding the eyes of the leaf spring on the longitudinal end zones of the central body.

9. The manufacturing process, according to claim 8, wherein the step of injecting polymeric resin of the central body into the injection mould is carried out using RTM.

10. The manufacturing process, according to claim 8, that the wherein the step of positioning of the fibre fabrics in the forming tool of the central body comprises the following steps:

positioning a set of fibre fabrics that extend in the longitudinal direction of the central body of the leaf spring to the longitudinal end zones of the central body, positioning a set of reinforcement fabrics located in the longitudinal direction of the central body and located in the longitudinal ends of the central body to form the increasing section of said ends.

11. The manufacturing process, according to claim 10, further comprising the step of:

positioning a set of reinforcement fabrics that extend longitudinally in the central area of the central body.

12. The manufacturing process, according to claim 8, wherein the fibre fabrics of the eyes are pre-impregnated and/or unidirectional so that the fibres will be placed in the longitudinal direction of the central body.

13. A mould for the manufacture of a leaf spring, wherein the leaf spring includes at least one leaf of composite material that includes a central body which has two longitudinal end zones and at least one sheet made of composite material and two eyes located in the longitudinal end zones of the central body that includes a hole for the connection of the leaf spring to a vehicle, wherein the hole includes a longitudinal axis perpendicular to the longitudinal direction of the central body, the mould comprising:

a mould cavity having the shape of the eyes for positioning fibre fabrics of the eyes and the ends of the central body of the leaf spring, wherein part of the fibre fabrics comprises a cavity for embedding the longitudinal end zones of the central body and so that the cavity comprises a section transversal to the longitudinal direction of the central body increasing toward the longitudinal end of the central body, the cavity for embedding the longitudinal end zones of the central body for positioning and attaching the longitudinal end zone of the central body when cured, such that the longitudinal end zones of the central body are embedded in the cavity of the fibre fabrics and so that the orientation of the fibres of the fibre fabrics of the eyes are located in the longitudinal direction of the central body and stacked in a direction parallel to the axis of the hole, and a pin for moulding the hole of the eye.

* * * * *